US011207780B2

(12) United States Patent
Moriya et al.

(10) Patent No.: US 11,207,780 B2
(45) Date of Patent: Dec. 28, 2021

(54) PATH PLANNING APPARATUS, PATH PLANNING METHOD, AND PATH PLANNING PROGRAM

(71) Applicant: OMRON Corporation, Kyoto (JP)

(72) Inventors: Toshihiro Moriya, Tokyo (JP); Kennosuke Hayashi, Tokyo (JP); Akane Nakashima, Nara (JP); Takeshi Kojima, Kyoto (JP); Haruka Fujii, Uji (JP)

(73) Assignee: OMRON Corporation, Kyoto (JP)

( * ) Notice: Subject to any disclaimer, the term of this patent is extended or adjusted under 35 U.S.C. 154(b) by 221 days.

(21) Appl. No.: 16/414,021

(22) Filed: May 16, 2019

(65) Prior Publication Data

US 2019/0375104 A1    Dec. 12, 2019

(30) Foreign Application Priority Data

Jun. 11, 2018  (JP) .............................. JP2018-111456

(51) Int. Cl.
*B25J 9/16*           (2006.01)

(52) U.S. Cl.
CPC .................................. *B25J 9/1676* (2013.01)

(58) Field of Classification Search
CPC ...... B25J 9/1676; B25J 9/1674; B25J 9/1666; B25J 9/1664
See application file for complete search history.

(56) References Cited

U.S. PATENT DOCUMENTS 8,918,208 B1 * 12/2014 Hickman ............... B25J 9/1602
                                                        700/253
2008/0306628 A1 * 12/2008 Ng-Thow-Hing ..... B25J 9/1664
                                                        700/245

(Continued)

FOREIGN PATENT DOCUMENTS

JP   2002-273675 A    9/2002
JP   2007-316942 A   12/2007

(Continued)

OTHER PUBLICATIONS

Pandya S et al., "A case-based approach to robot motion planning", [Proceedings of the Internaltional Conference on Systems, Man, and Cybernetics], New York, IEEE, US, Oct. 18, 1992, pp. 492-497, IEEE, Chicago, IL, USA; (Year: 1992).*

(Continued)

*Primary Examiner* — Khoi H Tran
*Assistant Examiner* — Nhi Q Bui
(74) *Attorney, Agent, or Firm* — Metrolex IP Law Group, PLLC

(57) ABSTRACT

A path planning apparatus is provided with a path planning unit that generates a path of a robot using a plurality of different path planning methods that respectively correspond to a plurality of different constraints determined from the posture of the robot and the characteristics of one or more obstacles that obstruct movement of the robot, an acquisition unit that acquires posture information indicating an initial posture of a robot for which a path is to be generated and a target posture of the robot, and obstacle information indicating a target obstacle that obstructs movement of the robot from the initial posture to the target posture, and a controller that controls the path planning unit so as to generate a path of the robot using a path planning method corresponding to a constraint determined from the posture information and the obstacle information acquired by the acquisition unit.

11 Claims, 12 Drawing Sheets

(56) References Cited

U.S. PATENT DOCUMENTS

| | | | |
|---|---|---|---|
| 2010/0168950 A1 | 7/2010 | Nagano | |
| 2012/0165982 A1* | 6/2012 | Kim | B25J 9/162 |
| | | | 700/255 |
| 2014/0121833 A1* | 5/2014 | Lee | B25J 9/1666 |
| | | | 700/255 |
| 2014/0277719 A1 | 9/2014 | Kamiya et al. | |

FOREIGN PATENT DOCUMENTS

| | | |
|---|---|---|
| JP | 2009-113190 A | 5/2009 |
| JP | 2009-211571 A | 9/2009 |
| JP | 2010-155328 A | 7/2010 |
| JP | 2014-115924 A | 6/2014 |
| JP | 2014-180705 A | 9/2014 |
| JP | 2018-001348 A | 1/2018 |

OTHER PUBLICATIONS

Pandya S et al., "A Case-Based Approach to Robot Motion Planning", Proceedings of the International Conference on Systems, Man, and Cybernetics, Oct. 18-21, 1992, pp. 492-497, IEEE, Chicago, IL, USA; Relevance is indicated in the extended European search report dated Oct. 25, 2019.

The extended European search report dated Oct. 25, 2019 in a counterpart European patent application.

Office Action (JPOA) dated Oct. 26, 2021 in a counterpart Japanese patent application.

* cited by examiner

PATH PLANNING APPARATUS, PATH PLANNING METHOD, AND PATH PLANNING PROGRAM

CROSS-REFERENCES TO RELATED APPLICATIONS

This application claims priority to Japanese Patent Application No. 2018-111456 filed Jun. 11, 2018, the entire contents of which are incorporated herein by reference.

FIELD

The disclosure relates to a path planning apparatus, a path planning method, and a path planning program.

BACKGROUND

Various methods have been proposed as a path planning method for automatically generating a path on which a robot arm does not interfere with an obstacle (for example, see JP 2009-211571A).

JP 2009-211571A is an example of background art.

Each path planning method for generating a path of a robot has both merits and demerits. For example, if the movement of a robot is limited by the positional relationship between a robot arm and one or more obstacles and the like, the time required for path generation increases if an inappropriate path planning method is applied. In this case, there has been a problem in that the start of an actual operation of the robot arm delays.

One or more aspects have been made in light of the above-described issue, and aim to provide a path planning apparatus, a path planning method, and a path planning program that can shorten the time required for generating a path of a robot.

SUMMARY

A path planning apparatus according to one or more aspects includes a path planning unit that generates a path of a robot using a plurality of different path planning methods that respectively correspond to a plurality of different constraints determined from a posture of the robot and a characteristic of an obstacle that obstructs movement of the robot, an acquisition unit that acquires posture information indicating an initial posture of a target robot for which a path is to be generated and a target posture of the target robot and obstacle information indicating a target obstacle that obstructs movement of the target robot from the initial posture to the target posture, and a controller that controls the path planning unit so as to generate a path of the target robot using a path planning method corresponding to a constraint that is determined from the posture information and the obstacle information acquired by the acquisition unit.

In addition, the plurality of different constraints may include a predetermined first constraint for a degree to which movement of the robot is limited by the obstacle, and a second constraint for a degree to which movement of the robot is limited by the obstacle and that is smaller than the first constraint, the path planning unit may include a first path planning unit that generates a path using a first path planning method corresponding to the first constraint and a second path planning unit that generates a path using a second path planning method corresponding to the second constraint, and, in a path of the target robot from an initial posture to a target posture, the controller may perform control so as to cause the first path planning unit to generate a path for a segment in which a relationship between a posture of the target robot and the target obstacle satisfies the first constraint, and to cause the second path planning unit to generate a path for a segment in which the relationship between the posture of the target robot and the target obstacle satisfies the second constraint.

In addition, the second constraint may be a condition that the first constraint is not satisfied, and the controller may perform control so as to, if a relationship between the initial posture and the obstacle satisfies the first constraint, cause the first path planning unit to generate a path for a first segment from the initial posture to a first intermediate posture that does not satisfy the first constraint, and if the relationship between the initial posture and the obstacle does not satisfy the first constraint, the second path planning unit to generate a path for the first segment, if a relationship between the target posture and the obstacle satisfies the first constraint, cause the first path planning unit to generate a path for a second segment from a second intermediate posture that does not satisfy the first constraint to the target posture, and, if the relationship between the target posture and the obstacle does not satisfy the first constraint, cause the second path planning unit to generate a path for the second segment, and cause the second path planning unit to generate a path for a third segment from the first intermediate posture to the second intermediate posture.

In addition, the constraint may be determined based on at least one of a positional relationship between the robot and the obstacle, a type of the obstacle, and the number of obstacles from an initial posture to a target posture of the robot.

In addition, the constraint may be determined from the type of the obstacle, the acquisition unit may acquire information indicating a shape of the target obstacle as the obstacle information, and the controller may identify the type of the target obstacle based on the shape of the target obstacle.

In a path planning method according to one or more aspects, a computer executes processing including, a step of generating a path of a robot using a plurality of different path planning methods that respectively correspond to a plurality of different constraints determined from a posture of the robot and a characteristic of an obstacle that obstructs movement of the robot, a step of acquiring posture information indicating an initial posture of a target robot for which a path is to be generated and a target posture of the target robot and obstacle information indicating a target obstacle that obstructs movement of the target robot from the initial posture to the target posture, and a step of performing control so as to generate a path of the target robot using a path planning method corresponding to a constraint that is determined from the posture information and the obstacle information acquired in the step of acquiring.

A path planning program according to one or more aspects causes a computer to function as a path planning unit that generates a path of a robot using a plurality of different path planning methods that respectively correspond to a plurality of different constraints determined from a posture of the robot and a characteristic of an obstacle that obstructs movement of the robot, an acquisition unit that acquires posture information indicating an initial posture of a target robot for which a path is to be generated and a target posture of the target robot and obstacle information indicating a target obstacle that obstructs movement of the target robot from the initial posture to the target posture, and a controller that controls the path planning unit so as to generate a path of the target robot using a path planning method corresponding to a constraint that is determined from the posture information and the obstacle information acquired by the acquisition unit.

According to one or more aspects, it is possible to shorten the time required for generating a path of a robot.

DETAILED DESCRIPTION

Figure 1:
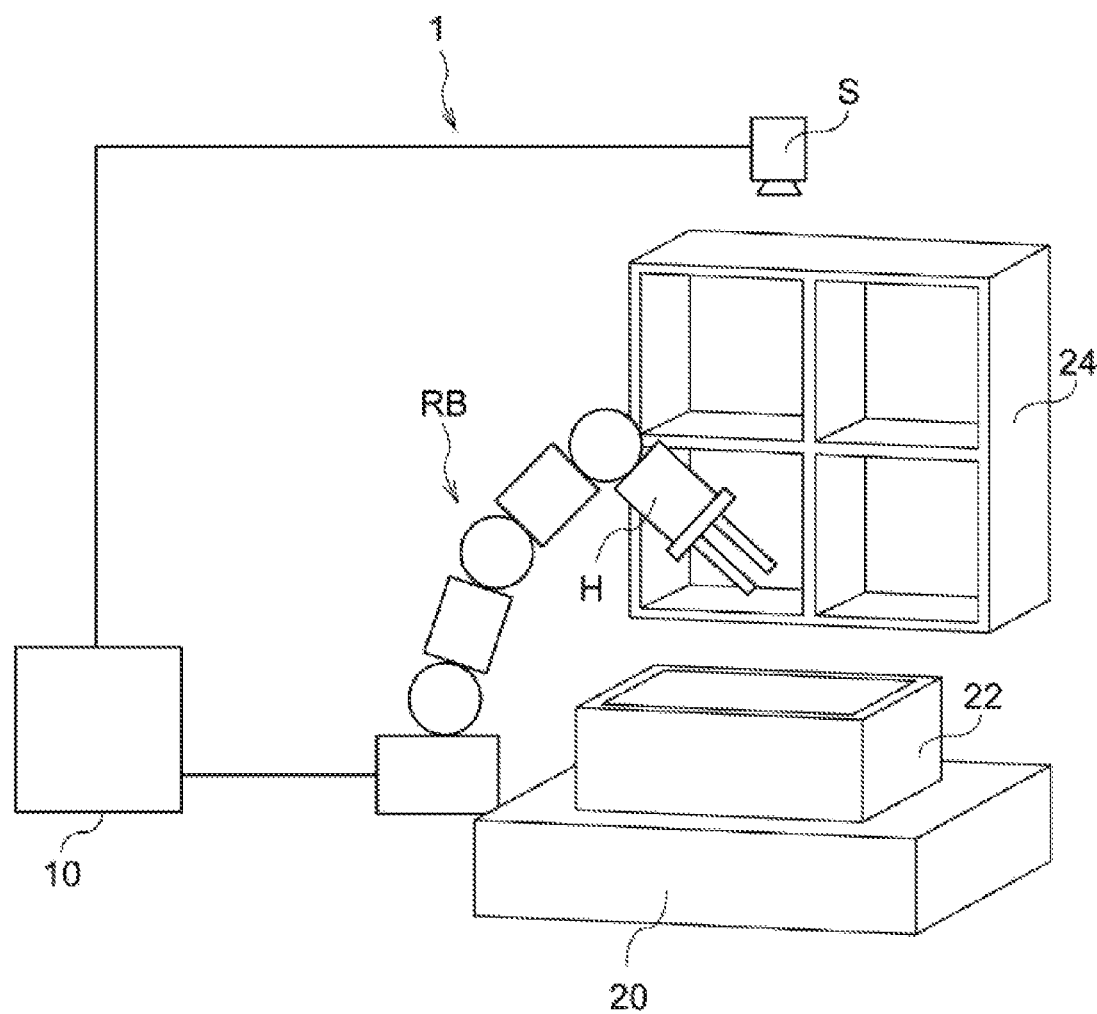
FIG. 1 is a schematic configuration diagram illustrating a pick-and-place apparatus.

Exemplary embodiments will be described below with reference to the drawings. Note that, in the drawings, the same reference numerals are assigned to the same or equivalent constituent elements and parts. In addition, dimension ratios in the drawings may be exaggerated for convenience of explanation, and may be different from the actual ratios.

FIG. 1 is a diagram of the configuration of a pick-and-place apparatus 1 according to one or more embodiments. As shown in FIG. 1, the pick-and-place apparatus 1 is provided with a robot RB, an image sensor S, and a path planning apparatus 10.

The robot RB holds a workpiece (not illustrated) housed in a box 22 provided on a stage 20, conveys the workpiece to a shelf 24, and places the workpiece in the shelf 24.

In one or more embodiments, as an example, a robot hand H is attached to the front end of a robot arm of the robot RB as an end effector, and by the robot hand H holding a workpiece in the box 22, the workpiece is held. The workpiece is then conveyed to the shelf 24 in a state where the workpiece is held, and holding of the workpiece is released so as to place the workpiece. Note that a member that holds the workpiece is not limited to the robot hand H, and may also be a suction pad that suctions the workpiece.

The image sensor S is installed above the box 22. The image sensor S shoots a still image of a workpiece group, which is a group of workpieces (not illustrated) housed in the box 22.

The path planning apparatus 10 generates a path from any initial posture to a target posture of the robot RB. Here, a "path" is a list of postures when the robot RB is operated from the initial posture to the target posture. Specifically, the path planning apparatus 10 performs image processing on a shot image acquired from the image sensor S, and recognizes the position and posture of a workpiece to be held, based on the result of the image processing. The path planning apparatus 10 then generates a first path in which a retracted posture in which the robot RB is retracted to a retracted position that is outside of the range of the field of view of the image sensor S in order to shoot the workpiece in the box 22 is set as an initial posture and a holding posture of the robot RB holding the workpiece in the box 22 is set as a target posture, a second path in which the holding posture of the robot RB holding the workpiece from within the box 22 is set as an initial posture and a placing posture of the robot RB placing the workpiece in the shelf 24 is set a target posture, and a third path in which the placing posture of the robot RB placing the workpiece in the shelf 24 is set as an initial posture and the retracted posture of the robot RB being retracted to the retracted position that is outside of the range of the field of view of the image sensor S in order to shoot the workpiece in the box 22 is set as a target posture. Note that a configuration may also be adopted in which an image sensor that shoots the shelf 24 is provided, and a position at which a workpiece is to be placed is recognized based on a shot image that has been shot by the image sensor. The path planning apparatus 10 then outputs operation command values to the robot RB so as to cause the robot RB to operate in accordance with the generated paths.

Next, the robot RB will be described. In one or more embodiments, as an example, a case will be described in which the robot RB is a vertically articulated robot, but one or more aspects can also be applied to a horizontally articulated robot (SCARA robot), a parallel link robot, a mobile robot, a flight robot (drone), a humanoid robot, and the like.

Figure 2:
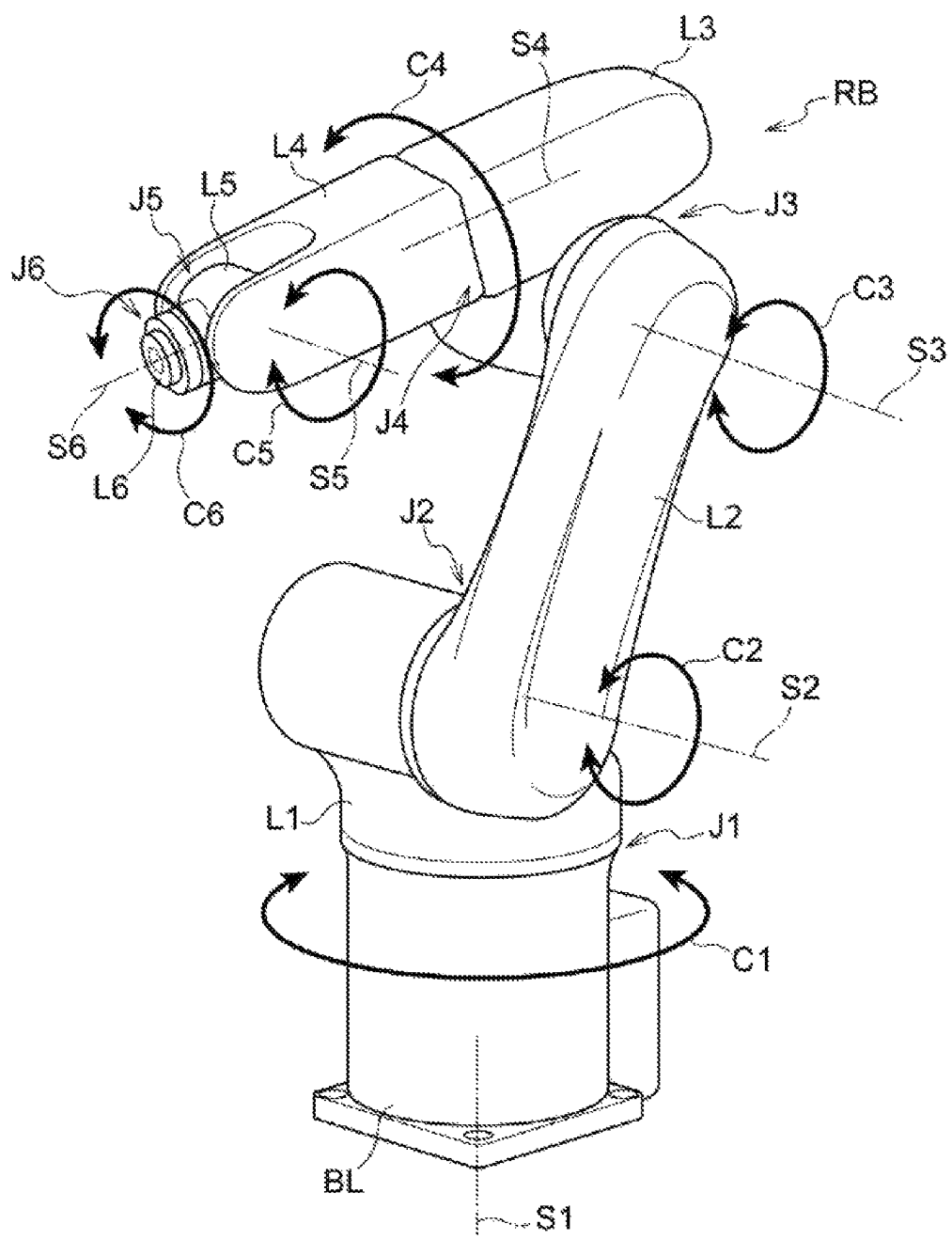
FIG. 2 is a perspective diagram illustrating an example of a vertically articulated robot.

FIG. 2 is a diagram showing the configuration of the robot RB, which is a vertically articulated robot. As shown in FIG. 2, the robot RB is a six-axis robot having six degrees of freedom provided with a base link BL, links L1 to L6, and joints J1 to J6. Note that a joint is a joint connecting links. In addition, hereinafter, the links L1 to L6 and the robot hand H connected to the link L6 are collectively referred to as "robot arm".

The base link BL and the link L1 are connected via the joint J1 that rotates about a vertical axis S1 in the direction of an arrow C1 in FIG. 2. Therefore, the link L1 rotates in the direction of the arrow C1 with the base link BL serving as a fulcrum.

The link L1 and the link L2 are connected via the joint J2 that rotates about a horizontal axis S2 in the direction of an arrow C2 in FIG. 2. Therefore, the link L2 rotates in the direction of the arrow C2 with the link L1 serving as a fulcrum.

The link L2 and the link L3 are connected via the joint J3 that rotates about an axis S3 in the direction of an arrow C3 in FIG. 2. Therefore, the link L3 rotates in the direction of the arrow C3 with the link L2 serving as a fulcrum.

The link L3 and the link L4 are connected via the joint J4 that rotates about an axis S4 in the direction of an arrow C4 in FIG. 2. Therefore, the link L4 rotates in the direction of the arrow C4 with the link L3 serving as a fulcrum.

The link L4 and the link L5 are connected via the joint J5 that rotates about an axis S5 in the direction of an arrow C5 in FIG. 2. Therefore, the link L5 rotates in the direction of the arrow C5 with the link L4 serving as a fulcrum.

The link L5 and the link L6 are connected via the joint J6 that rotates about an axis S6 in the direction of an arrow C6 in FIG. 2. Therefore, the link L6 rotates in the direction of the arrow C6 with the link L5 serving as a fulcrum. Note that the robot hand H, which is not illustrated in FIG. 2, is attached to the link L6.

Predetermined ranges of angles of rotation are respectively set as movable ranges of the joints J1 to J6.

The posture of the robot RB depends on the angles of rotation of the joints J1 to J6. Therefore, operation command values for operating the robot RB refer to the angles of rotation of the joints J1 to J6 corresponding to a posture to be assumed by the robot RB.

Figure 3:
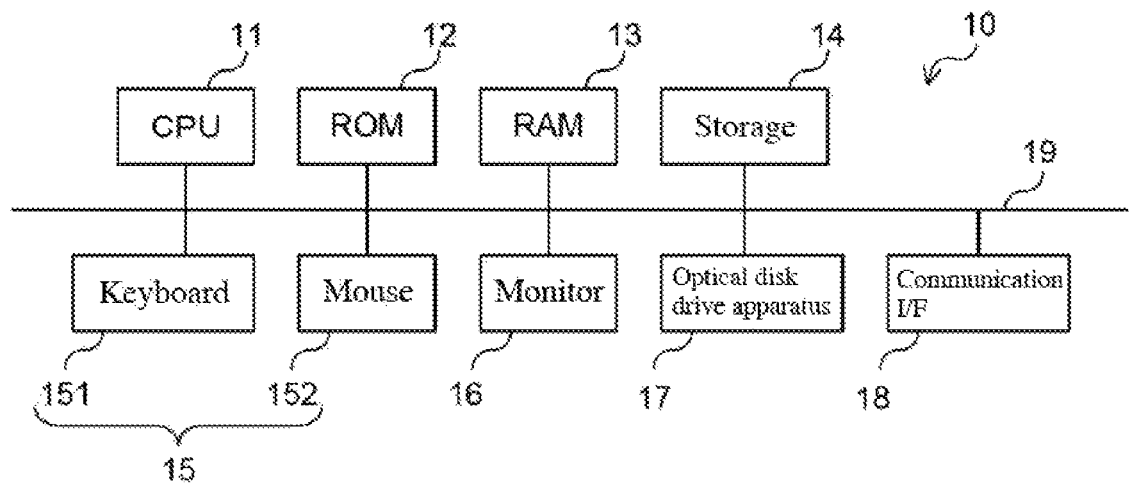
FIG. 3 is a configuration diagram illustrating an exemplary hardware configuration of a path planning apparatus.

FIG. 3 is a block diagram showing the hardware configuration of the path planning apparatus 10 according to one or more embodiments.

As shown in FIG. 3, the path planning apparatus 10 has a CPU (central processing unit) 11, a ROM (read only memory) 12, a RAM (random access memory) 13, a storage 14, an input unit 15, a monitor 16, an optical disk drive apparatus 17, and a communication interface 18. These constituent elements are communicably connected to each other via a bus 19.

In one or more embodiments, a path planning program for executing path planning is stored in the ROM 12 or the storage 14. The CPU 11 stands for central processing unit, and executes various programs and controls constituent elements. Specifically, the CPU 11 reads out a program from the ROM 12 or the storage 14, and executes the program using the RAM 13 as a work region. The CPU 11 performs processing for controlling the above constituent elements and processing for various types of calculation in accordance with programs recorded in the ROM 12 or the storage 14.

The ROM 12 stores various programs and various types of data. The RAM 13 temporarily stores programs or data, as a work region. The storage 14 is constituted by an HDD (hard disk drive) or an SSD (solid state drive), and stores various programs, including an operating system, and various types of data.

The input unit 15 includes a keyboard 151 and a pointing device, such as a mouse 152, and is used for performing various types of input. The monitor 16 is a liquid crystal display, for example, and displays various pieces of information. The monitor 16 may function as the input unit 15 by adopting a touch panel system. The optical disk drive apparatus 17 reads out data stored in any of various recording media (a CD-ROM, a Blue-ray disk, etc.), writes data to a recording medium, and the like.

The communication interface 18 is an interface for communicating with other apparatuses such as the robot RB and the image sensor S, and, for example, an Ethernet (registered trademark), FDDI, Wi-Fi (registered trademark), USB (universal serial bus), IEEE1394, or other connection may be used.

Next, the functional configuration of the path planning apparatus 10 will be described.

Figure 4:
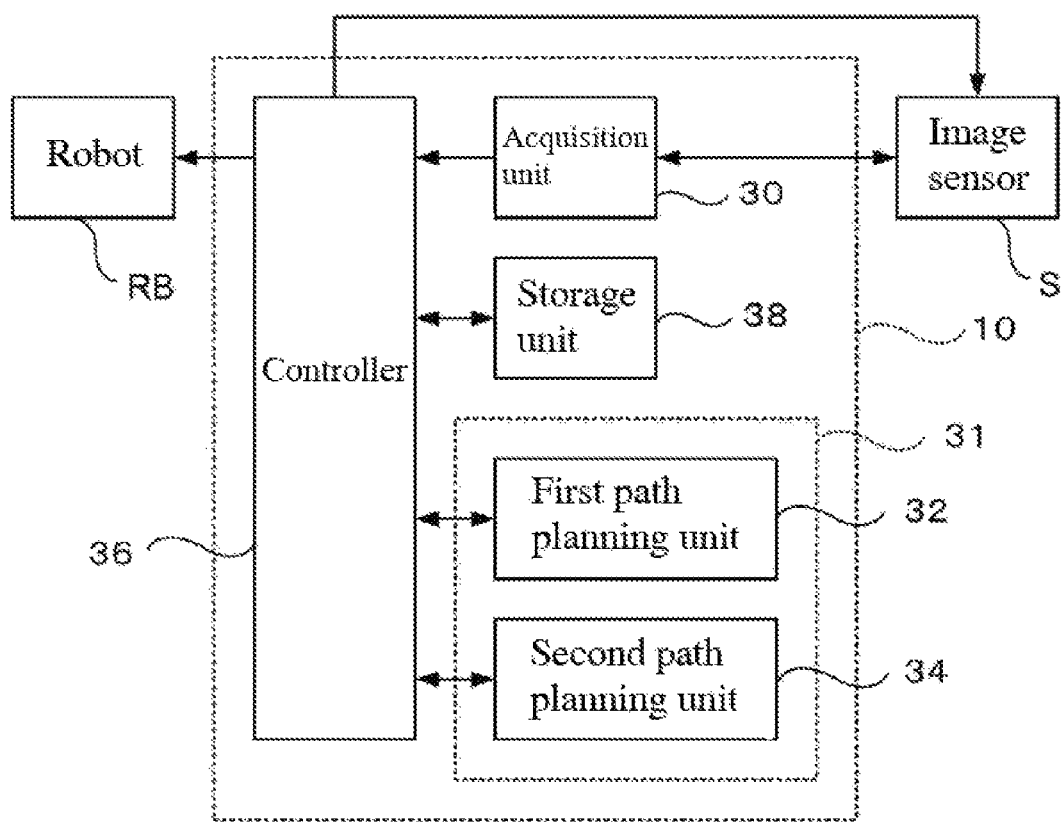
FIG. 4 is a block diagram illustrating an exemplary functional configuration of a path planning apparatus.

FIG. 4 is a block diagram showing an exemplary functional configuration of the path planning apparatus 10.

As shown in FIG. 4, the path planning apparatus 10 has an acquisition unit 30, a path planning unit 31, a controller 36, and a storage unit 38, as the functional configuration. The path planning unit 31 is provided with a first path planning unit 32 and a second path planning unit 34. The functional configuration is realized by the CPU 11 reading out a path planning program stored in the ROM 12 or the storage 14, loading the program to the RAM 13, and executing the program.

The path planning unit 31 generates paths of a robot using path planning methods that respectively correspond to a plurality of different constraints (boundary conditions, limiting conditions) that are determined from the posture of the robot and the characteristics of an obstacle that obstructs (hinders) movement of the robot (i.e. an obstacle to the robot's movement), and are different for the plurality of different constraints.

The path planning unit 31 is provided with the first path planning unit 32 that generates a path using a first path planning method corresponding to a predetermined first constraint for a degree (extent) to which movement of the robot is limited by an obstacle and the second path planning unit 34 that generates a path using a second path planning method corresponding to a second constraint for a smaller degree to which movement of the robot is limited by the obstacle. That is to say, the degree to which movement of the robot is limited by an obstacle is smaller for the second constraint than for the first constraint.

Note that, in one or more embodiments, as an example, a case will be described in which the path planning unit 31 is provided with two path planning units, namely the first path planning unit 32 and the second path planning unit 34, but a configuration may also be adopted in which three or more path planning units that use different path planning methods are provided.

The acquisition unit 30 acquires posture information indicating an initial posture of the robot RB that is a target robot for which a path is to be generated and a target posture of the robot RB, and obstacle information indicating a target obstacle that obstructs movement of the robot RB from the initial posture to the target posture. Note that the stage 20, the box 22, and the shelf 24 shown in FIG. 1 are examples of target obstacles that obstruct movement of the robot RB.

Figure 5:
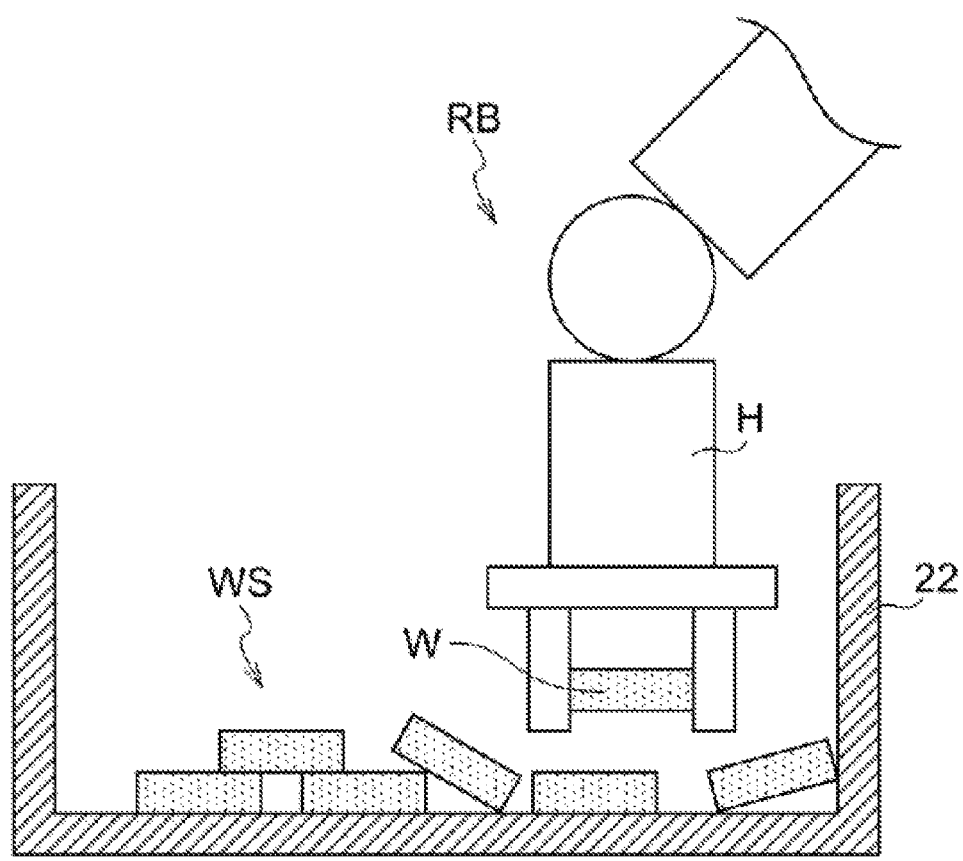
FIG. 5 is a diagram illustrating an example of an initial posture of a robot.
Figure 6:
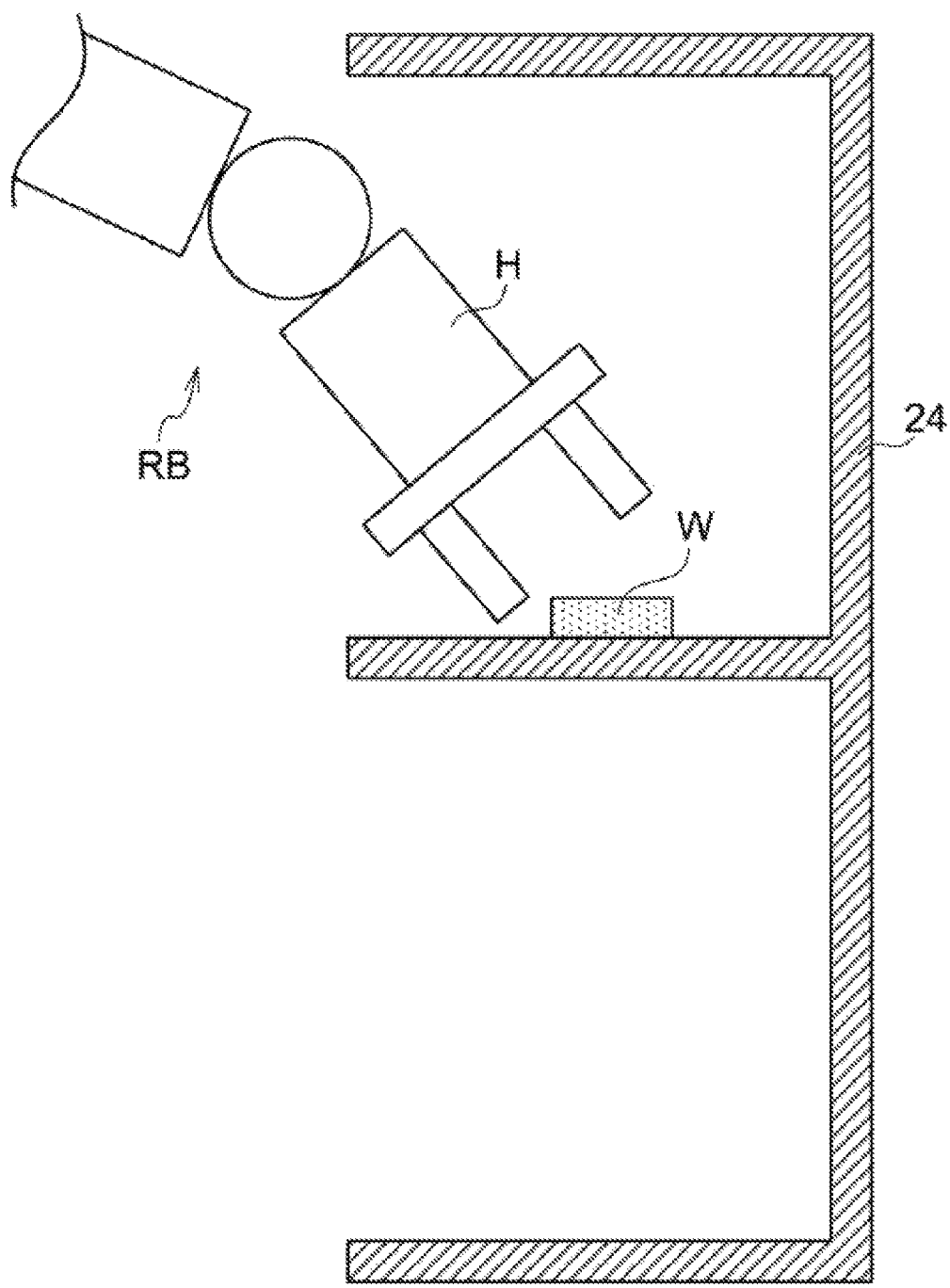
FIG. 6 is a diagram illustrating an example of a target posture of a robot.

Here, the initial posture of the robot RB is a posture when the robot RB starts a predetermined task. Also, the target posture of the robot RB is a posture when the robot RB ends the predetermined task. For example, in the example of FIG. 1, the predetermined task includes a first task for holding a workpiece in the box 22 from the above-mentioned retracted position, a second task for placing the held workpiece in the shelf 24, and a third task for retracting to the retracted position in order to hold the next workpiece. The second of these tasks will be described as an example. In the second task, the initial posture of the robot RB is a posture when the robot hand H of the robot RB holds a workpiece W selected from a workpiece group WS in the box 22, for example, as shown in FIG. 5. Also, the target posture of the robot RB is a posture when the workpiece is placed in the shelf 24 by the robot hand H, as shown in FIG. 6. Note that both the initial posture of the robot RB shown in FIG. 5 and the target posture of the robot RB shown in FIG. 6 are exemplary, and there is no limitation thereto.

In addition, examples of the obstacle information include information indicating a type, a shape, a position and the like of an obstacle. Note that examples of the type of an obstacle include the plate-like stage 20, the box 22, and the shelf 24 as shown in FIG. 1. In addition, the type of an obstacle with a recess having a certain depth or more may be defined as having "a shape that may surround the robot arm".

The constraint is determined from the posture of a robot and the characteristics of an obstacle that obstructs movement of the robot. Examples of the characteristics of an obstacle include the shape and the type of the obstacle, and the number of obstacles. A constraint is determined based on at least one of the positional relationship between a robot and an obstacle, the type of an obstacle, and the number of obstacles from an initial posture to a target posture of a robot, for example.

Specifically, examples of the constraint include a condition that the type of obstacle refers to an obstacle having a shape that may surround a robot arm, such as a box or a shelf, and at least a portion of the robot hand H of the robot RB may be surrounded by the obstacle, a condition that the distance between the robot hand H of the robot RB and an obstacle is not greater than a predetermined threshold value, and a condition that the number of obstacles between an initial posture and a target posture of the robot RB is at least a predetermined number, but there is no limitation thereto.

In addition, "first path planning method corresponding to the first constraint" refers to a path planning method according to which the time required for path generation is shorter than with any other path planning method when a path is generated using a plurality of different path planning methods under the first constraint. Similarly, "second path planning method corresponding to the second constraint" refers to a path planning method according to which the time required for path generation is shorter than with any other path planning method when a path is generated using a plurality of different path planning methods under the second constraint.

Various known methods can be adopted as a path planning method. Examples of the path planning method include RRT (rapidly exploring random tree), RRT*, which is an improved version of RRT, RRT connect, EET (exploring/exploiting tree), PRM (probabilistic roadmap method), which is a random sampling method similar to the RRT, an improved version of PRM, CHOMP (covariant hamiltonian optimization for motion planning), which is an optimization technique, STOMP (stochastic trajectory optimization for motion planning), among others.

Here, PRM is an example of a path planning method according to which the time required for path generation is relatively short under a condition that a degree to which movement of the robot RB is limited is relatively large. Generation of a path using PRM will be schematically described below.

Figure 7:
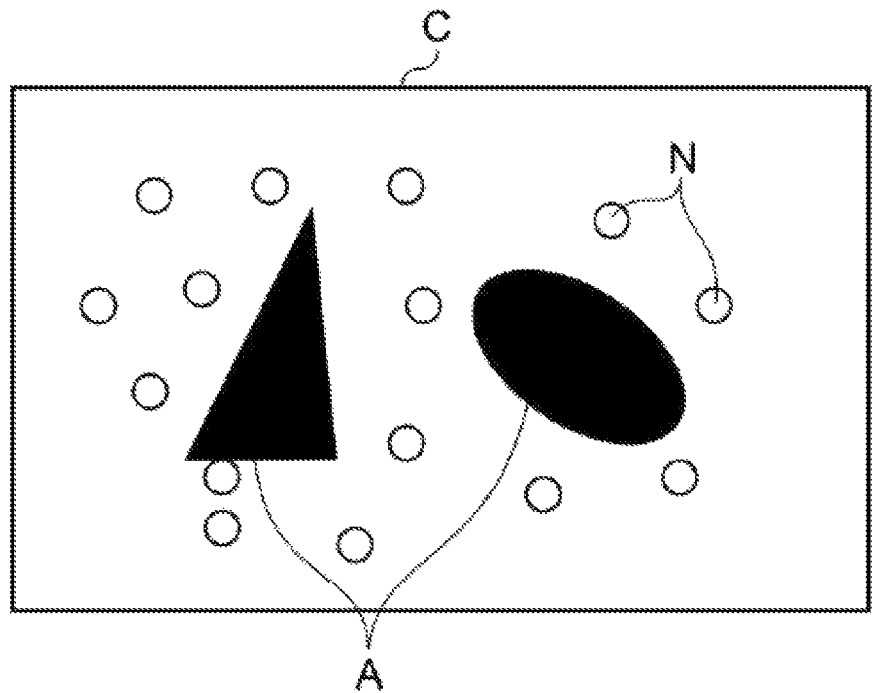
FIG. 7 is a diagram illustrating PRM as a path planning method.

In PRM, as shown in FIG. 7, nodes N are randomly generated in a space of a configuration space C excluding an obstacle A. Here, the configuration space is a space in which the angles of rotation of the joints J1 to J6 of the robot RB are indicated by coordinate axes.

Figure 8:
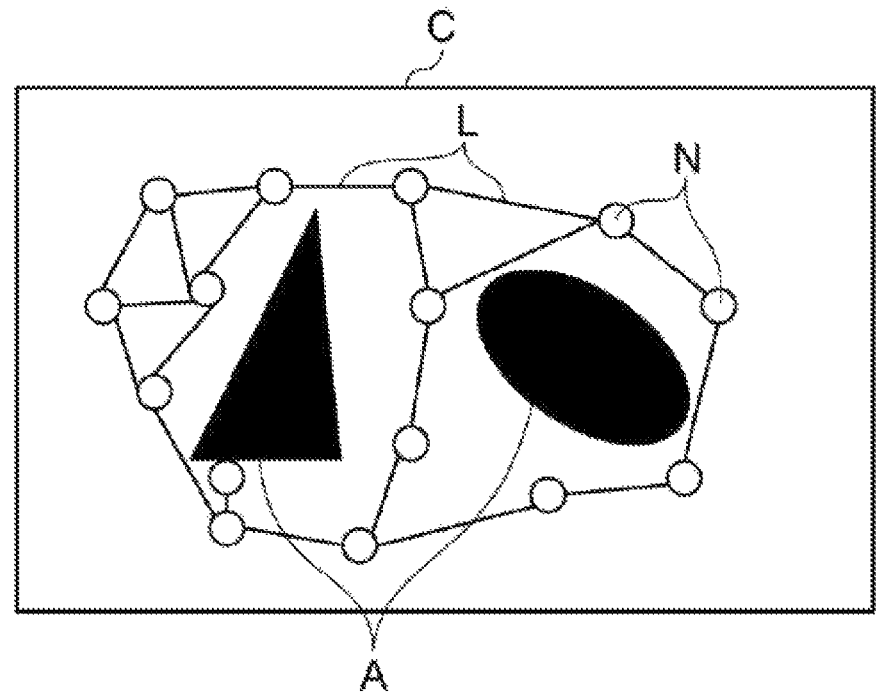
FIG. 8 is a diagram illustrating PRM as a path planning method.
Figure 9:
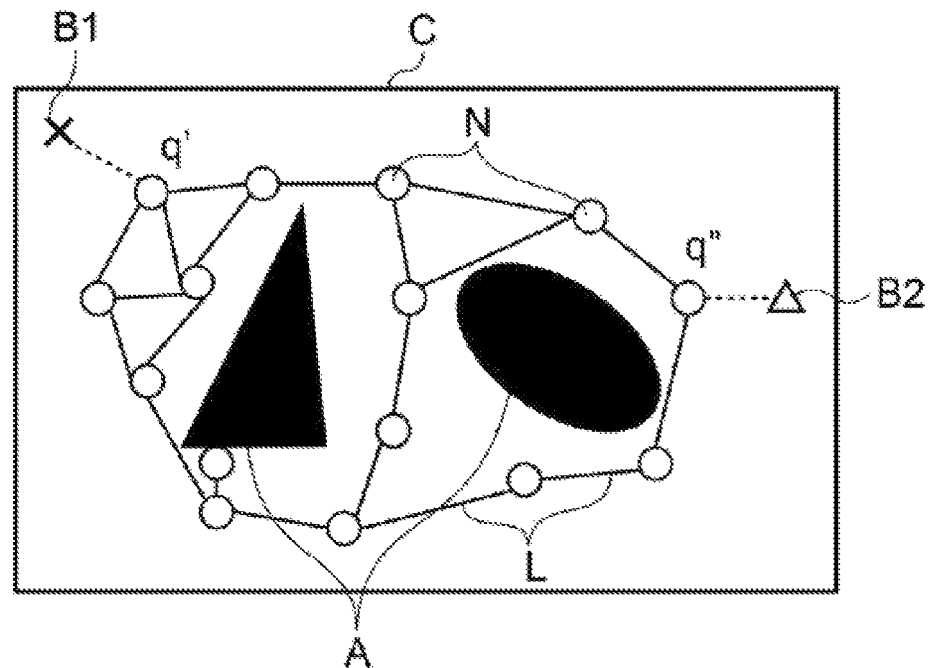
FIG. 9 is a diagram illustrating PRM as a path planning method.
Figure 10:
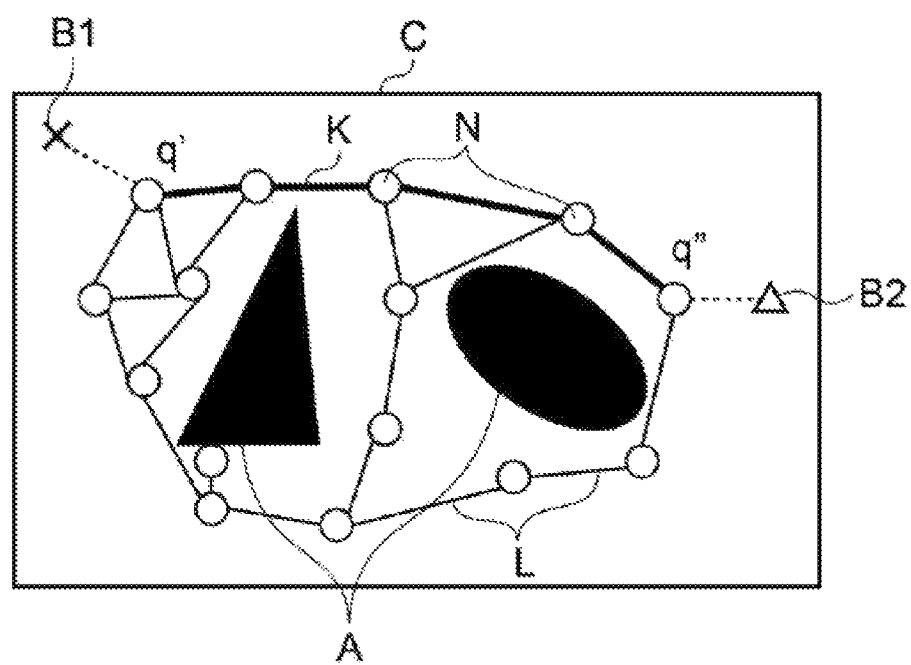
FIG. 10 is a diagram illustrating PRM as a path planning method.

Next, as shown in FIG. 8, nodes N near each other are connected by lines L. Next, as shown in FIG. 9, the node q' closest to the initial posture B1 and the node q" closest to the target posture B2 are searched for. Next, as shown in FIG. 10, the shortest path K between the node q' and the node q" is searched for.

In PRM, valid paths in the configuration space are calculated in advance, and thus, even if a degree to which movement of the robot RB is limited by one or more obstacles is large, a path can be generated in a short time.

On the other hand, CHOMP is an example of a path planning method according to which the time required for path generation is relatively short under a condition that the degree to which movement of the robot RB is limited is small. Generation of a path using CHOMP will be schematically described below.

First, an initial posture and a target posture are connected using a straight line. Next, an evaluation function that includes parameters indicating ease of avoiding obstacles and the smoothness of the trajectory is set. Subsequently, a gradient of the evaluation function that has been set is obtained, and an optimum path is searched for using the steepest descent method.

In CHOMP, the initial posture and the target posture are connected using a line, and the processing is then started, and thus if there are a few obstacles in the periphery of the robot RB, it is highly probable that a path can be generated in a short time.

Therefore, for example, PRM can be adopted as the first path planning method, and CHOMP can be adopted as the second path planning method.

The controller 36 controls the path planning unit 31 so as to let the path planning unit 31 generate a path of a target robot using a path planning method corresponding to a constraint determined from posture information and obstacle information acquired by the acquisition unit 30. Specifically, in the first to third paths of the robot RB, the controller 36 performs control so as to cause the first path planning unit 32 to generate a path for a segment in which the relationship between the posture of the robot RB and one or more obstacles satisfies the first constraint, and cause the second path planning unit 34 to generate a path for a segment in which the relationship between the posture of the robot RB and one or more obstacles satisfies the second constraint.

The storage unit 38 stores various types of information such as a path planning program, shape data of the base link BL and the links L1 to L6 of the robot RB, information indicating the movable ranges of the joints J1 to J6, shape data of the robot hand H, shape data of workpieces, and information indicating the shapes and positions of one or more obstacles.

Next, an effect of the path planning apparatus 10 will be described.

Figure 11:
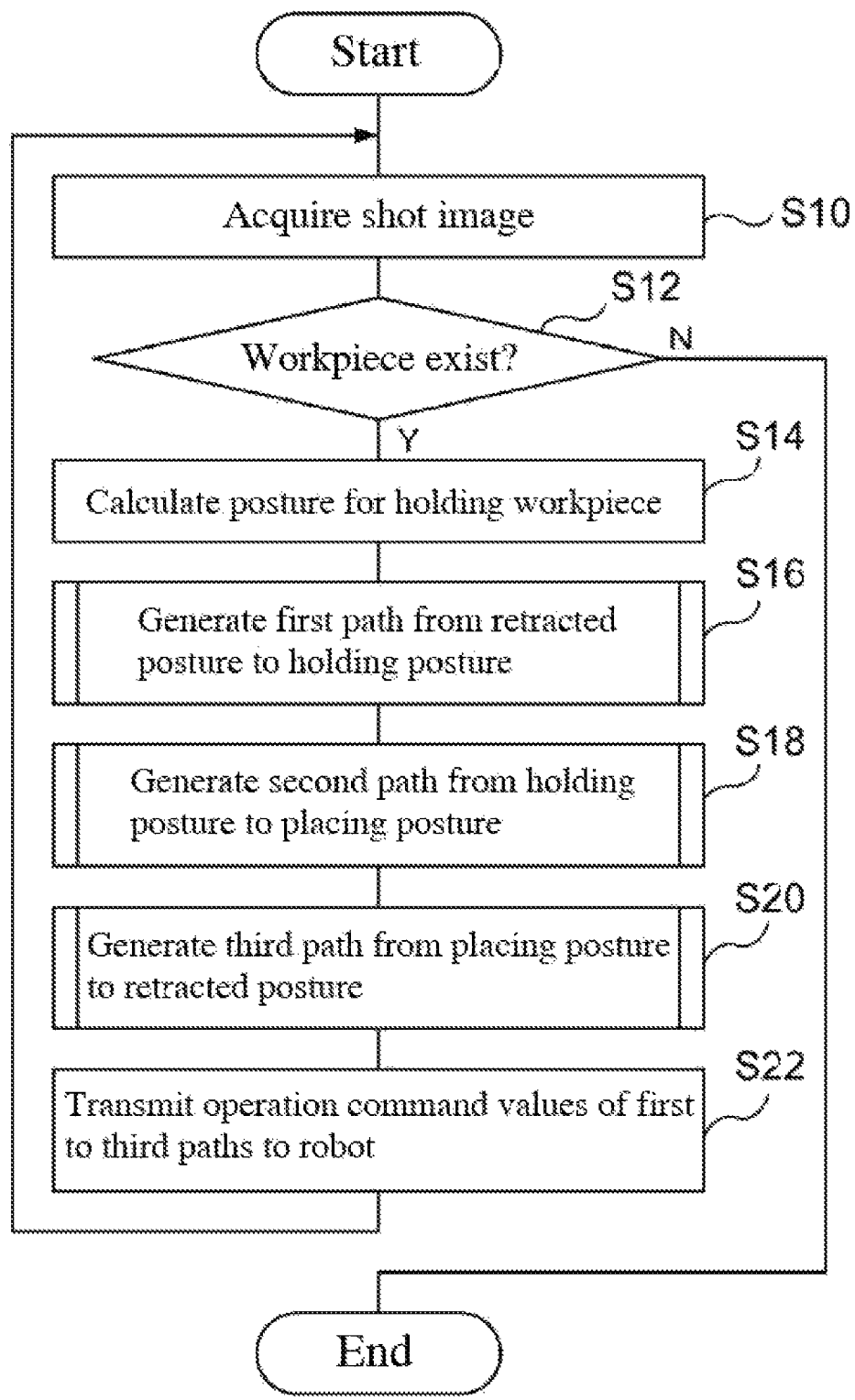
FIG. 11 is a flow diagram illustrating a flow of processing of a path planning apparatus.

FIG. 11 is a flowchart showing a flow of path planning that is executed by the CPU 11 of the path planning apparatus 10. When the operator instructs execution of path planning, path planning is executed by the CPU 11 reading out a path planning program from the ROM 12 or the storage 14, loading the program to the RAM 13, and executing the program.

Functioning as the controller 36, the CPU 11 instructs the image sensor S to perform shooting, and, functioning as the acquisition unit 30, acquires a shot image that has been shot by the image sensor S (step S10).

Functioning as the controller 36, the CPU 11 determines whether or not there is any workpiece W in the box 22, based on the shot image acquired in step S10 (step S12). In other words, the CPU 11 determines whether or not all of the workpieces W of the workpiece group WS have been conveyed from the box 22 to the shelf 24. Specifically, image processing is performed on the shot image acquired in step S16, and it is determined whether or not there is any workpiece W in the shot image, for example. In addition, if the number of workpieces originally placed in the box 22 is known in advance, it may be determined whether or not the number of times a workpiece was conveyed has reached the original number of workpieces.

If there is no workpiece W in the box 22, in other words, if all of the workpieces W have been conveyed (step S10: YES), this routine is ended. On the other hand, if there is any workpiece W left in the box 22, in other words, if not all of the workpieces have been conveyed (step S10: NO), the procedure jumps to step S14.

Functioning as the controller 36, the CPU 11 selects a workpiece W to be held based on the shot image, and calculates a posture of the robot RB for holding the selected workpiece W (step S14). For example, a workpiece W at the top in the workpiece group WS is selected, a workpiece W in the center in the workpiece group WS is selected, or a workpiece W that does not overlap another workpiece W is selected, as ways to select a workpiece W to be held, but there is no limitation thereto.

After a workpiece W to be held is selected, a posture of the robot hand for holding the selected workpiece W is acquired. For this, it suffices if a configuration is adopted in which postures of the robot hand corresponding to the shapes of the workpieces W are stored in the storage unit 38 in advance, and a posture corresponding to the shape of the selected workpiece W is read out from the storage unit 38, for example. Next, a position and posture of the robot hand for actually holding the workpiece W are calculated based on the acquired posture of the robot hand and the position and posture of the workpiece W to be held. At last, a posture of the robot RB for realizing the calculated position and posture of the robot hand, in other words a target posture is calculated using a known technique called IK (Inverse Kinematics).

Functioning as the controller 36, the CPU 11 generates a first path in which a retracted posture of the robot RB being retracted to a retracted position is set as an initial posture, and a holding posture of the robot RB holding a workpiece in the box 22 is set as a target posture (step S16).

Functioning as the controller 36, the CPU 11 generates a second path in which the holding posture of the robot RB holding the workpiece from out of the box 22 is set as an initial posture, and a placing posture of the robot RB placing the workpiece in the shelf 24 is set as a target posture (step S18).

Functioning as the controller 36, the CPU 11 generates a third path in which the placing posture of the robot RB placing the workpiece in the shelf 24 is set as an initial posture, and the retracted posture of the robot RB being retracted to the retracted position is set as a target posture (step S20).

Figure 12:
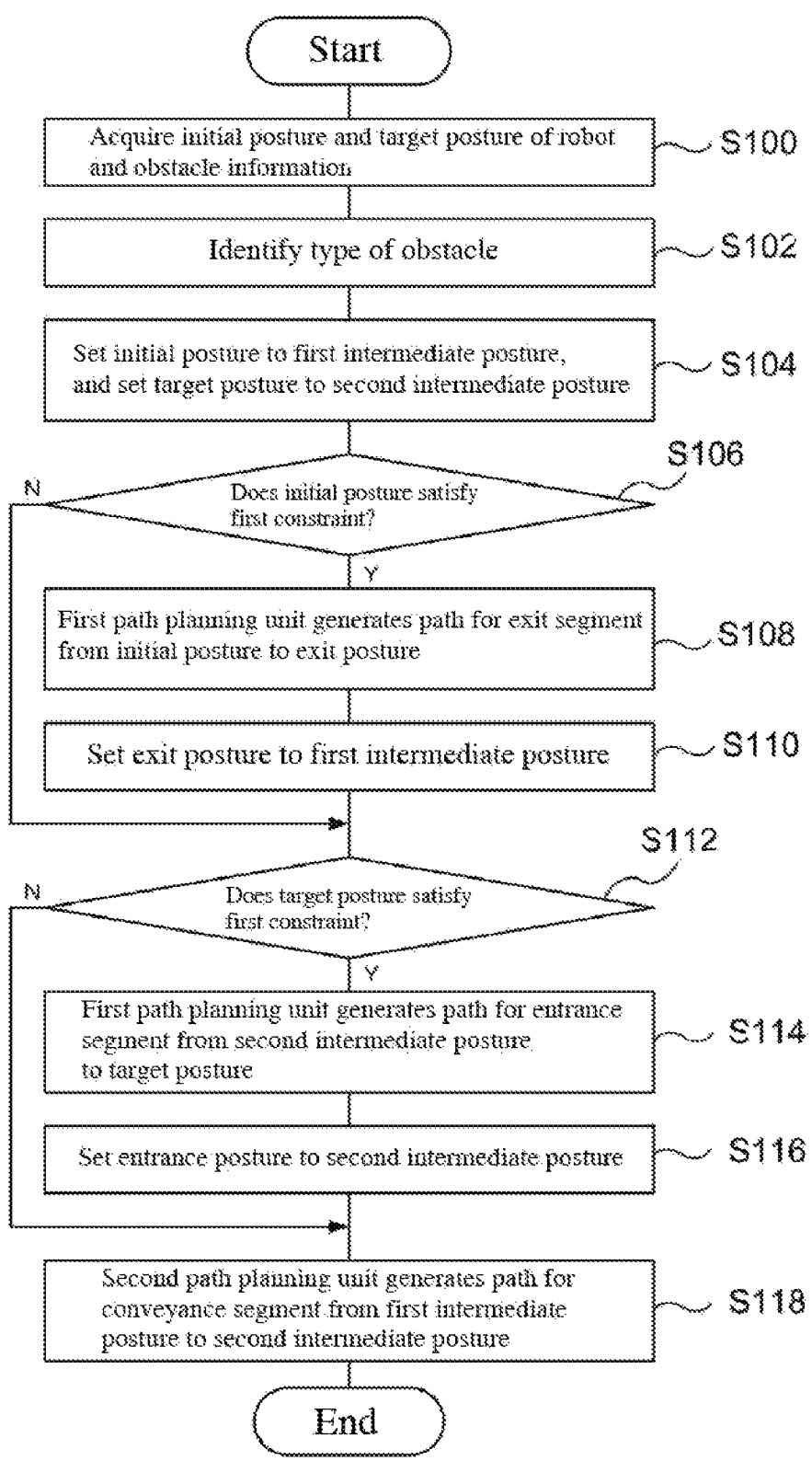
FIG. 12 is a flow diagram illustrating a specific flow of path generation processing.

Processing for generating first to third paths will be described below with reference to FIG. 12. In each of steps S16 to S20, the processing in FIG. 12 is executed. Note that a case will be described below in which the second constraint is the condition that the first constraint is not satisfied. In other words, a case will be described in which the first constraint not being satisfied is the same as the second constraint being satisfied.

Functioning as the acquisition unit 30 in the processing in FIG. 12, the CPU 11 acquires posture information indicating an initial posture of the robot RB and a target posture of the robot RB and obstacle information indicating one or more obstacles that obstruct movement of the robot RB from the initial posture to the target posture (step S100).

Here, when generating a first path, the initial posture is a retracted posture, and the target posture is a holding posture. Also, when generating a second path, the initial posture is a holding posture, and the target posture is a placing posture. Moreover, when generating a third path, the initial posture is a placing posture, and the target posture is a retracted posture.

Note that, when generating a second path, the target posture, namely a placing posture of the robot RB placing a workpiece in the shelf 24 can be acquired as follows. For example, a plurality of placing locations provided in the shelf 24 are taught in advance, and position information indicating the plurality of taught placing locations and a placing order in which the workpieces are placed at the plurality of placing locations are stored in the storage 14, which functions as the storage unit 38. A posture of the robot RB when a workpiece is placed at a placing location determined in accordance with the placing order is set as a target posture. Note that a configuration may also be adopted in which an image sensor for shooting the shelf 24 is provided, and a placing location at which a workpiece is to be placed is selected based on a shot image acquired by shooting the shelf 24, similar to the case where a workpiece to be held is selected. In this case, it is sufficient that the posture of the robot RB when placing the workpiece at the selected placing location is set as a target posture, which is calculated similar to the above-described calculation of the target posture of the first path.

As described above, the posture of the robot RB depends on the angles of rotation of the joints J1 to J6. Therefore, information regarding an initial posture of the robot RB is information indicating the angles of rotation of the joints J1 to J6 corresponding to the initial posture. In addition, information representing a target posture of the robot RB is information representing the angles of rotation of the joints J1 to J6 corresponding to the target posture.

Obstacle information indicating one or more obstacles that obstruct movement of the robot RB from the initial posture to the target posture of the robot RB is information indicating the shapes and positions of the obstacles as an example in one or more embodiments. A configuration can also be adopted in which the obstacle information is stored in the storage 14 in advance, and is read out from the storage 14, for example.

Functioning as the controller 36, the CPU 11 identifies types of the obstacles based on the information indicating the shapes of the obstacles acquired in step S100 (step S102). The type of obstacle is identified based on a predetermined rule. For example, the rule may be a rule that, if the shape of an obstacle includes a recess having a certain depth or more in the height direction, the type of the obstacle is determined to be a "box". The rule may also be a rule that, if the obstacle has a shape with a recess having at least a certain length in a direction orthogonal to the height direction, the type of the obstacle is determined to be a "shelf". The rule may also be a rule that, if the obstacle has a shape with a recess having at least a certain depth, the type of the obstacle is determined as having a "shape that can surround the robot arm". Note that the predetermined rule is not limited thereto. In addition, it is sufficient that the obstacle types are identified when a workpiece is conveyed for the first time. Therefore, when this routine is executed for the second time onward, the process in step S102 may be omitted.

Functioning as the controller 36, the CPU 11 sets the initial posture of the robot RB to a first intermediate posture, and sets the target posture of the robot RB to a second intermediate posture (step S104).

Figure 13:
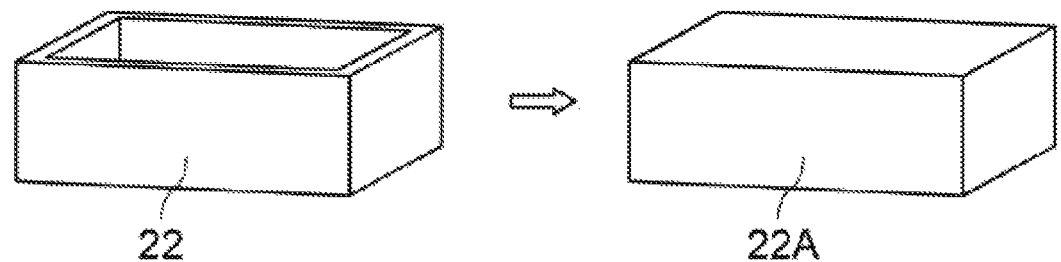
FIG. 13 is a diagram illustrating a determination on whether or not a robot arm is surrounded by a box.
Figure 14:
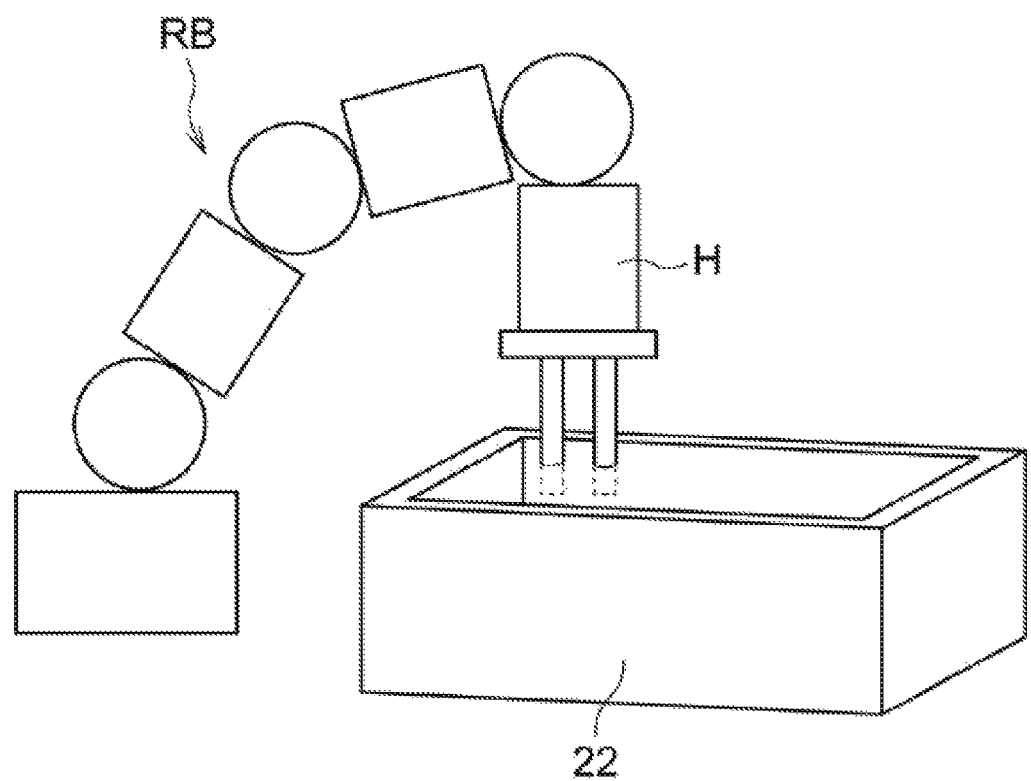
FIG. 14 is a diagram illustrating a determination on whether or not a robot arm is surrounded by a box.

Functioning as the controller 36, the CPU 11 determines whether or not the initial posture of the robot RB satisfies the first constraint (step S106). Specifically, if the type of an obstacle is "box" or "shelf", whether or not at least a portion of the robot arm of the robot RB is surrounded by a box or a shelf is determined. For example, if the obstacle is the box 22, the box 22 is turned into a bounding box, and is thereby converted into an object 22A having a simple shape, as shown in FIG. 13. If it is determined, using a known interference determination technique, that the robot arm interferes with the object 22A, it is determined that at least a portion of the robot arm is surrounded by the box 22 as shown in FIG. 14, and if it is determined that the robot arm does not interfere with the object 22A, it is determined that the robot arm is not surrounded by the box 22. Here, interference refers to the robot and the obstacle coming into contact with each other. In addition, the technique described in JP-A-2002-273675 can be used as the known interference determination technique, for example. Note that the box 22 may also be converted into a simple shape by performing convex shaping or turning the box 22 into a bounding sphere.

If the initial posture of the robot RB satisfies the first constraint (step S106: YES), in other words, if at least a portion of the robot arm is surrounded by the box 22 as the initial posture of the robot RB, when generating a second path, for example, the CPU 11 functions as the first path planning unit 32 and generates a path for an exit segment from the initial posture of the robot RB to an exit posture after the robot arm of the robot RB exits from the box 22 (step S108). Here, the exit posture of the robot RB is a posture in which the robot RB does not satisfy the first constraint, in other words, a posture that satisfies the second constraint. Specifically, the exit posture is a posture in which the robot arm has exited from the box 22 and is no longer surrounded by the box 22, in other words, a posture in which a degree to which movement of the robot RB is limited by the box 22 is small.

The exit posture of the robot RB may be taught in advance and stored in the storage unit 38 if the robot RB operates in a segment that is fixed to a certain extent as in a pick and place operation. In this case, a posture in which the robot hand has exited from the center of the box 22 upward in the vertical direction and is completely out of the box 22 may be stored as the exit posture in the storage unit 38. Also, a configuration may be adopted in which, when the robot RB operates in any space, not a segment that is fixed to a certain extent, the first path planning unit 32 executes path planning between the initial posture and the target posture or any posture that is easily obtained as a solution in path planning, the first path planning unit 32 stops path planning at the time when a posture that does not satisfy the first constraint occurs, and the posture at this time is set as the exit posture. Note that the exit segment is an example of a first segment of one or more embodiments.

Functioning as the controller 36, the CPU 11 sets the exit posture to the first intermediate posture (step S110).

On the other hand, if the robot RB does not satisfy the first constraint (step S106: NO), the procedure jumps to step S112.

Functioning as the controller 36, the CPU 11 determines whether or not the target posture of the robot RB satisfies the first constraint (step S112). Specifically, if the type of an obstacle is "box" or "shelf", whether or not at least a portion of the robot arm of the robot RB is surrounded by the box or shelf is determined similar to step S106.

If the target posture of the robot RB satisfies the first constraint (step S112: YES), specifically, for example, in generation of the second path, if at least a portion of the robot arm is surrounded by the shelf 24 as the target posture of the robot RB, the CPU 11 functions as the first path planning unit 32 so as to generate a path for an entrance segment from the entrance posture immediately before the robot arm of the robot RB enters the shelf 24 to the target posture (step S114). Here, the entrance posture of the robot RB is a posture in which the robot RB does not satisfy the first constraint, in other words a posture in which the robot arm is not surrounded by the shelf 24 before entering the shelf 24.

The entrance posture of the robot RB can be set similar to the exit posture. Specifically, the entrance posture of the robot may be taught in advance and stored in the storage unit 38 if the robot RB operates in a segment that is fixed to a certain extent as in a pick and place operation. In this case, a posture in which the robot hand is in front of the shelf 24 and is completely out of the shelf 24 may be stored as the entrance posture in the storage unit 38. In addition, a configuration may be adopted in which, when the robot RB operates in any space, not a segment that is fixed to a certain extent, the first path planning unit 32 executes path planning between the target posture and the initial posture or any posture that is easily obtained as a solution in path planning, the first path planning unit 32 stops path planning at the time when a posture that does not satisfy the first constraint occurs, and the posture at this time is set as the entrance posture. If this method is used for generating a path for the entrance segment, a path from the target posture toward the entrance posture is generated, and thus the order needs to be reversed. Note that the entrance segment is an example of a second segment of one or more embodiments.

Functioning as the controller 36, the CPU 11 sets the entrance posture to the second intermediate posture (step S116).

On the other hand, if the robot RB does not satisfy the first constraint (step S112: NO), the procedure jumps to step S118.

Functioning as the second path planning unit 34, the CPU 11 generates a path for a conveyance segment from the first intermediate posture to the second intermediate posture (step S118). Note that the conveyance segment is an example of a third segment of one or more embodiments.

Returning to FIG. 11, the CPU 11 generates operation command values of the robot RB based on the first to third paths of the robot RB, and transmits the operation command values to the robot RB (step S22). Accordingly, the robot RB moves in accordance with the first to third paths that have been generated. Specifically, the robot RB moves from the retracted position, holds a workpiece in the box 22, places the workpiece at a predetermined position of the shelf 24, and returns to the retracted position.

Figure 15:
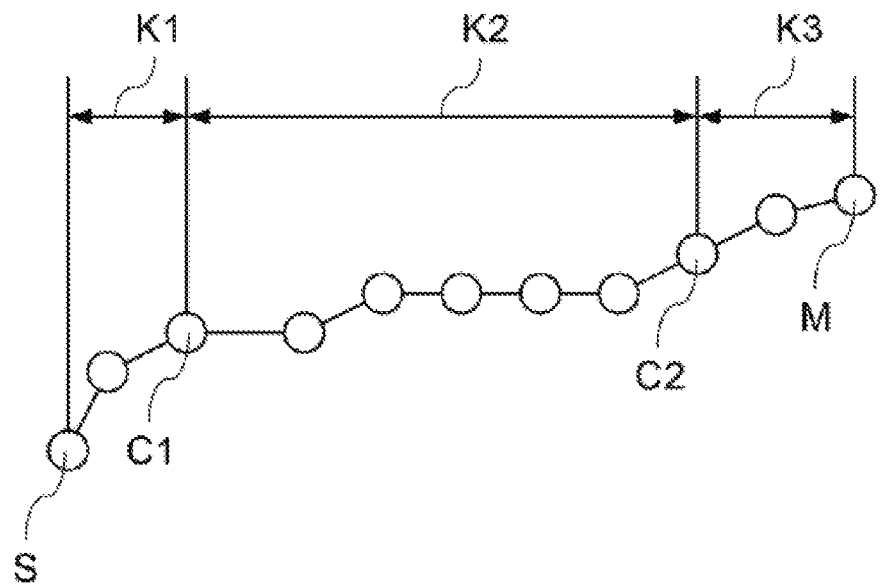
FIG. 15 is a schematic diagram schematically illustrating paths.

FIG. 15 schematically shows path planning if both the initial posture and the target posture of the robot RB on the second path satisfy the first constraint (step S106: YES, step S112: YES). Circles in FIG. 15 indicate postures of the robot RB in a configuration space. If both the initial posture and the target posture of the robot RB satisfy the first constraint, the first path planning unit 32 generates a path for an exit segment K1 from an initial posture S to a first intermediate posture C1 that does not satisfy the first constraint and a path for an entrance segment K3 from a second intermediate posture C2 that does not satisfy from the first constraint to a target posture M, as shown in FIG. 15. In addition, the second path planning unit 34 generates a path for a conveyance segment K2 from the first intermediate posture to the second intermediate posture.

Figure 16:
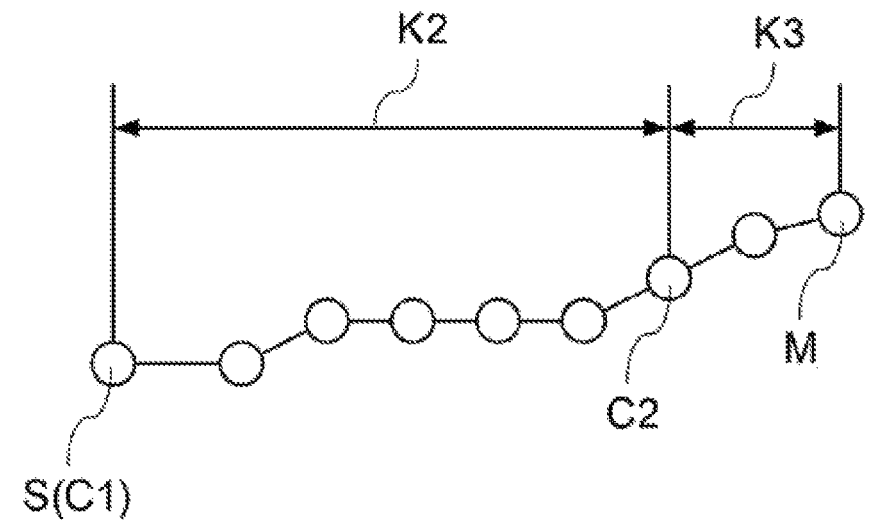
FIG. 16 is a schematic diagram schematically illustrating paths.

In addition, FIG. 16 schematically shows path planning if only the target posture of the robot RB satisfies the first constraint (step S106: NO, step S112: YES), as in the case of generating the first path in step S16 in FIG. 11. In this case, as shown in FIG. 16, the first intermediate posture C1 is replaced with the initial posture S, and thus the second path planning unit 34 generates a path for the conveyance segment K2 from the first intermediate posture C1 to the second intermediate posture C2. In addition, the first path planning unit 32 generates a path for the entrance segment K3 from the second intermediate posture C2 that does not satisfy the first constraint to the target posture M.

In addition, if, as in a case of generating the third path in step S20 in FIG. 11, only the initial posture of the robot RB satisfies the first constraint (step S106: YES, step S112: NO), which is not illustrated, the first path planning unit 32 generates a path for the exit segment K1 from the initial posture S to the first intermediate posture C1. In addition, a second intermediate posture S2 is replaced with the target posture M, and thus the second path planning unit 34 generates a path for the conveyance segment K2 from the first intermediate posture to the second intermediate posture S2 (the target posture M).

In addition, if, as in the case of generating the second path in step S18 in FIG. 11, both the initial posture and the target posture of the robot RB do not satisfy the first constraint (step S106: NO, step S112: NO), which is not illustrated, the first intermediate posture C1 is replaced with the initial posture S, and the second intermediate posture S2 is replaced with the target posture M, and there is only the conveyance segment K2. Therefore, the second path planning unit 34 generates a path for the conveyance segment K2.

As described above, in one or more embodiments, in the first to third paths of the robot RB, the first path planning unit 32 generates a path for a segment in which the relationship between the posture of the robot RB and one or more obstacles satisfies the first constraint, and the second path planning unit 34 generates a path for a segment in which the relationship between the posture of the robot RB and one or more obstacles does not satisfy the first constraint, in other words, satisfies the second constraint.

Therefore, it is possible to shorten the time required for generating a path of the robot RB, and it is possible to prevent a start of an operation of the robot RB from delaying.

The path planning apparatus 10 is not limited to the above embodiments, and various modifications can be made. For example, in one or more embodiments, a type of an obstacle is identified based on information indicating the shape of the obstacle in step S102 in FIG. 12, but types of obstacles may be stored in the storage 14 in advance. In this case, the process in step S102 can be omitted.

In addition, in one or more embodiments, a case has been described in which the robot RB is a vertically articulated robot, but, as described above, one or more aspects can be applied to another type of robot. Note that, when an exit posture is set in step S108 in FIG. 12, it is required to set the exit posture using a method specific to the type of a robot, depending on the type of a robot.

Figure 17:
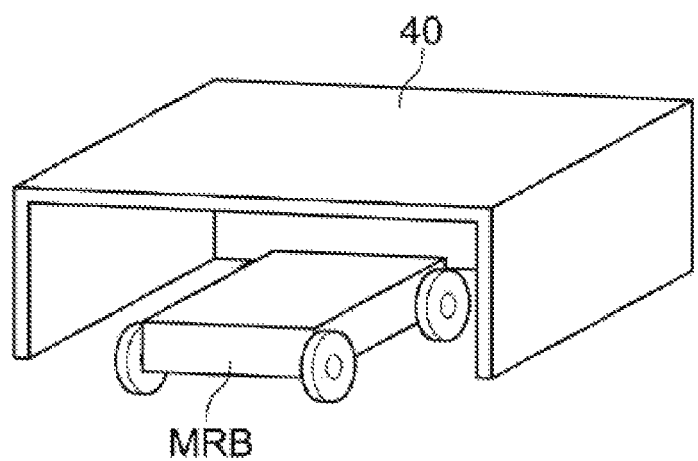
FIG. 17 is a diagram illustrating an exit posture of a mobile robot.

For example, when generating a path for allowing a mobile robot MRB shown in FIG. 17 to exit from a garage 40 that is an obstacle, a position separated by a predetermined distance toward the front of the mobile robot MRB is set as an exit posture based on heuristic knowledge that "the exit of the garage is located in front of the robot". In addition, a mobile robot is normally provided with a sensor such as a laser radar. Therefore, a configuration may be adopted in which the opening of the garage 40 is searched for using a sensor such as a laser radar, and a position separated by a predetermined distance toward the front of the opening that has been found may be set as an exit posture. Note that also if a flight robot is surrounded by an obstacle, an exit posture can be set similarly to the case of the mobile robot MRB. However, in the case of a flight robot, if the opening of an obstacle is open in the vertical direction with respect to the ground, a path may be generated in the vertical direction unlike the case of the mobile robot MRB.

Figure 18:
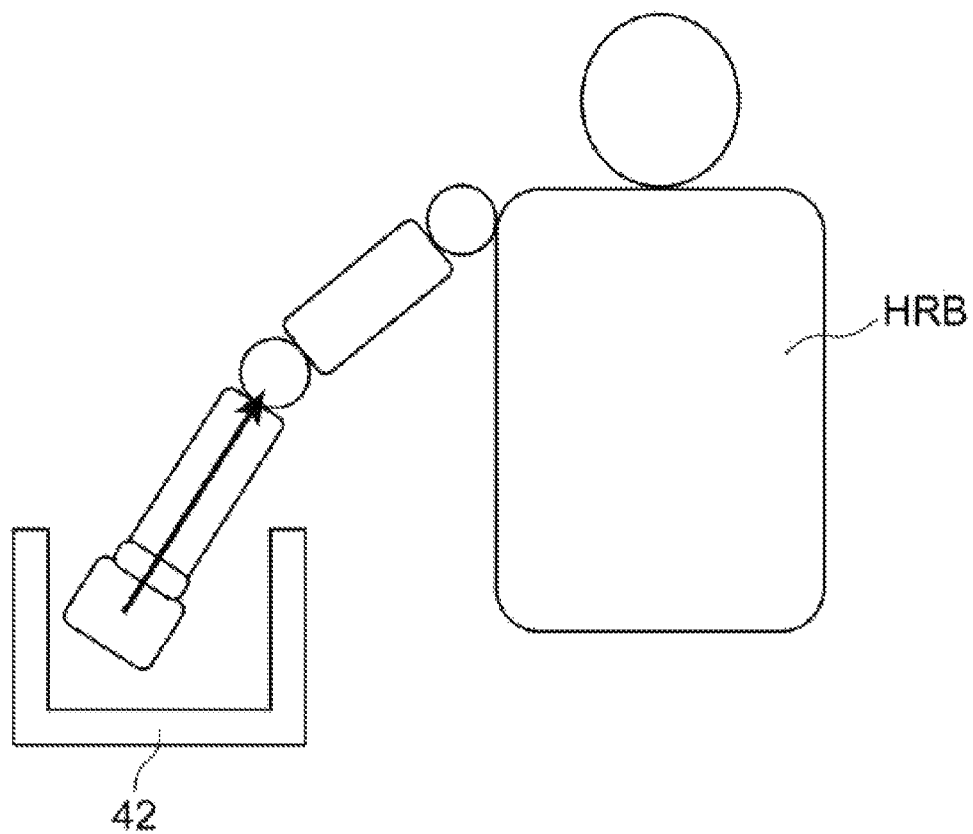
FIG. 18 is a diagram illustrating an exit posture of a humanoid robot.

In addition, for example, when a tip end of a robot arm of a humanoid robot HRB shown in FIG. 18 is surrounded by a box 42 that is an obstacle, and a path for allowing the robot arm to exit from the box 42 is generated, for example, a position of the robot arm corresponding to an elbow is set as the position of the hand in an exit posture.

Note that path planning that is executed by the CPU reading software (program) in the above embodiments may be executed by any of various types of processors other than the CPU. Examples of the processor in this case include a PLD (programmable logic device) whose circuit configuration can be changed after manufacturing such as an FPGA (field-programmable gate array), a dedicated electric circuit that is a processor having a circuit configuration designed dedicatedly for executing specific processing such as an ASIC (application specific integrated circuit), and the like. In addition, path planning may be executed by one of these various processors, or may be executed by a combination of two or more processors of the same type or different types (a plurality of FPGAs, a combination of a CPU, an FPGA, etc.). In addition, as more specific hardware structures of these various types of processors, an electric circuit acquired by combining circuit elements such as a semiconductor element is provided.

In addition, in the above embodiments, an aspect has been described in which a path planning program is stored (installed) in the storage 14 or the ROM 12 in advance), but there is no limitation thereto. The program may be provided in an aspect of being recorded in a recording medium such as a CD-ROM (compact disk read only memory), a DVD-ROM (digital versatile disk read only memory), or a USB (universal serial bus) memory. In addition, an aspect may be adopted in which the program is downloaded from an external apparatus via a network. Furthermore, in one or more embodiments, a case has been described in which path planning and other processes are executed by the path planning apparatus 10, but an aspect may be adopted in which path planning and other processes are executed in a decentralized environment.

LIST OF REFERENCE NUMERALS

1 Pick-and-place apparatus
10 Path planning apparatus
30 Acquisition unit
31 Path planning unit
32 First path planning unit
34 Second path planning unit
36 Controller
38 Storage unit

The invention claimed is:

1. A path planning apparatus, comprising:
a processor configured with a program to perform operations comprising:
operation as a path planning unit configured to generate a path of a robot comprising a target robot, the path generated based on one of a plurality of different path planning methods respectively corresponding to a plurality of different constraints that is determined to provide a shortest time of path generation from an initial posture of the target robot and a characteristic of an obstacle that obstructs movement of the target robot;

operation as an acquisition unit configured to acquire: posture information indicating the initial posture of the target robot and a target posture of the target robot; and obstacle information indicating the characteristic of the target obstacle that obstructs the movement of the target robot from the initial posture to the target posture; and operation as a first path planning unit configured to:
evaluate each of the plurality of path planning methods and the respective corresponding constraint based on the initial posture and the obstacle information to determine which of the plurality of path planning methods provides the shortest time of path generation;

generate the path of the target robot based on a first one of the plurality of path planning methods respectively corresponding to a first one of the plurality of constraints in response to determining that the initial posture satisfies the first one of the plurality of constraints, the first one of the plurality of constraints comprising a degree to which movement of the robot is limited by the obstacle; and generate, the path of the target robot based on a second one of the plurality of path planning methods respectively corresponding to a second one of the plurality of constraints in response to determining that the initial posture does not satisfy the first one of the plurality of constraints and satisfies the second one of the plurality of constraints, the second one of the plurality of constraints comprising a degree, smaller than the first constraint, to which movement of the robot is limited by the obstacle.

2. The path planning apparatus according to claim 1, wherein:

the processor is configured with the program to perform operations further comprising operation as a second path planning unit configured to generate the path using the second one of the plurality of path planning methods respectively corresponding to the second one of the plurality of constraints in response to determining that the initial posture does not satisfy the first one of the plurality of constraints and satisfies the second one of the plurality of constraints; and the processor is configured with the program to perform operations such that operation as the first path planning unit comprises generating a first segment of the path in which a relationship between a posture of the target robot in the first segment and the target obstacle satisfies the first one of the plurality of constraints, and operation as the second path planning unit comprises generating a second segment of the path in which the relationship between the posture of the target robot in the second segment and the target obstacle satisfies the second constraint.

3. The path planning apparatus according to claim 2, wherein the second one of the plurality of constraints comprises a condition that the first one of the plurality of constraints is not satisfied, and the processor is configured with the program to perform operations such that:
in response to a relationship between the initial posture and the obstacle satisfying the first one of the plurality of constraints, operation as the first path planning unit comprises generating the path for the first segment from the initial posture to a first intermediate posture that does not satisfy the first one of the plurality of constraints, and, if the relationship between the initial posture and the obstacle does not satisfy the first one of the plurality of constraints, operation as the second path planning unit comprises generating the path for the first segment, in response to a relationship between the target posture and the obstacle satisfying the first one of the plurality of constraints, operation as the first path planning unit comprises generating the path for the second segment from a second intermediate posture that does not satisfy the first one of the plurality of constraints to the target posture, and, if the relationship between the target posture and the obstacle does not satisfy the first one of the plurality of constraints, operation as the second path planning unit comprises generating the path for the second segment, and operation as the second path planning unit comprises generating a path for a third segment from the first intermediate posture to the second intermediate posture.

4. The path planning apparatus according to claim 1, wherein the plurality of constraints are determined based on at least one of a positional relationship between the robot and the obstacle, a type of the obstacle, and the number of obstacles from an initial posture to a target posture of the robot.

5. The path planning apparatus according to claim 4, wherein the plurality of constraints are determined from the type of the obstacle, the processor is configured with the program to perform operations such that operation as the acquisition unit comprises acquiring information indicating a shape of the target obstacle as the obstacle information, and the processor is configured with the program to perform operations further comprising identifying the type of the target obstacle based on the shape of the target obstacle.

6. The path planning apparatus according to claim 2, wherein the plurality of constraints are determined based on at least one of a positional relationship between the robot and the obstacle, a type of the obstacle, and the number of obstacles from an initial posture to a target posture of the robot.

7. The path planning apparatus according to claim 6, wherein the plurality of constraints are determined from the type of the obstacle, the processor is configured with the program to perform operations such that operation as the acquisition unit comprises acquiring information indicating a shape of the target obstacle as the obstacle information, and the processor is configured with the program to perform operations further comprising identifying the type of the target obstacle based on the shape of the target obstacle.

8. The path planning apparatus according to claim 3, wherein the plurality of constraints are determined based on at least one of a positional relationship between the robot and the obstacle, a type of the obstacle, and the number of obstacles from an initial posture to a target posture of the robot.

9. The path planning apparatus according to claim 8, wherein
the processor is configured with the program to perform operations such that operation as the acquisition unit comprises acquiring information indicating a shape of the target obstacle as the obstacle information, and
the processor is configured with the program to perform operations comprising identifying the type of the target obstacle based on the shape of the target obstacle.

10. A path planning method, wherein a computer executes processing, comprising:
generating a path of a robot comprising a target robot, the path generated based on one of a plurality of different path planning methods respectively corresponding to a plurality of different constraints that is determined to provide a shortest time of path generation from an initial posture of the target robot and a characteristic of an obstacle that obstructs movement of the target robot;
acquiring: posture information indicating the initial posture of the target robot and a target posture of the target robot; and obstacle information indicating the characteristic of the target obstacle that obstructs the movement of the target robot from the initial posture to the target posture;
evaluating each of the plurality of path planning methods and the respective corresponding constraint based on the initial posture and the obstacle information to determine which of the plurality of path planning methods provides the shortest time of path generation;
generating the path of the target robot based on a first one of the plurality of path planning methods respectively corresponding to a first one of the plurality of constraints in response to determining that the initial posture satisfies the first one of the plurality of constraints, the first one of the plurality of constraints comprising a degree to which movement of the robot is limited by the obstacle; and
generating the path of the target robot based on a second one of the plurality of path planning methods respectively corresponding to a second one of the plurality of constraints in response to determining that the initial posture does not satisfy the first one of the plurality of constraints and satisfies the second one of the plurality of constraints, the second one of the plurality of constraints comprising a degree, smaller than the first constraint, to which movement of the robot is limited by the obstacle.

11. A non-transitory computer-readable storage medium storing a path planning program, which when read and executed, causes a computer to perform operations comprising:
operation as a path planning unit configured to generate a path of a robot comprising a target robot, the path generation based on one of a plurality of different path planning methods respectively corresponding to a plurality of different constraints that is determined to provide a shortest time of path generation from an initial posture of the target robot and a characteristic of an obstacle that obstructs movement of the target robot;
operation as an acquisition unit configured to acquire posture information indicating the initial posture of the target robot and a target posture of the target robot; and obstacle information indicating the characteristic of the target obstacle that obstructs the movement of the target robot from the initial posture to the target posture; and
operation as a first path planning unit configured to:
evaluate each of the plurality of path planning methods and the respective corresponding constraint based on the initial posture and the obstacle information to determine which of the plurality of path planning methods provides the shortest time of path generation;
generate the path of the target robot based on a first one of the plurality of path planning methods respectively corresponding to a first one of the plurality of constraints in response to determining that the initial posture satisfies the first one of the plurality of constraints, the first one of the plurality of constraints comprising a degree to which movement of the robot is limited by the obstacle; and
generate, the path of the target robot based on a second one of the plurality of path planning methods respectively corresponding to a second one of the plurality of constraints in response to determining that the initial posture does not satisfy the first one of the plurality of constraints and satisfies the second one of the plurality of constraints, the second one of the plurality of constraints comprising a degree, smaller than the first constraint, to which movement of the robot is limited by the obstacle.

* * * * *